United States Patent
Toman et al.

(10) Patent No.: US 7,492,705 B1
(45) Date of Patent: Feb. 17, 2009

(54) CHANGING LINE CARDS ASSOCIATED WITH A COMMUNICATIONS NETWORK

(75) Inventors: Ronald L. Toman, Olathe, KS (US); Warren K. Okeson, Olathe, KS (US); Larry C. Lambert, Las Vegas, NV (US)

(73) Assignee: Embarq Holdings Company, LLC, Overland Park, KS (US)

( * ) Notice: Subject to any disclaimer, the term of this patent is extended or adjusted under 35 U.S.C. 154(b) by 618 days.

(21) Appl. No.: 11/154,620

(22) Filed: Jun. 16, 2005

(51) Int. Cl.
*G01R 31/08* (2006.01)

(52) U.S. Cl. .......................... 370/217; 370/360; 714/43

(58) Field of Classification Search ........................ None
See application file for complete search history.

(56) References Cited

U.S. PATENT DOCUMENTS 5,596,569 A * 1/1997 Madonna et al. ............ 370/217
5,999,621 A * 12/1999 Martin et al. ............... 379/438
6,879,559 B1 * 4/2005 Blackmon et al. ........... 370/225
7,234,000 B2 * 6/2007 McEachern et al. ......... 709/235

* cited by examiner

*Primary Examiner*—Duc C Ho
(74) *Attorney, Agent, or Firm*—Sonnenschein Nath & Rosenthal LLP

(57) ABSTRACT

A method and system is provided for replacing a first set of line cards with new line cards. A call-processing unit (CPU) is provided that includes a primary memory unit and a secondary memory unit. A line-card holder is populated with a second set of line cards that are interfaced with the call-processing unit. Provision is made for the data that was being processed by the original set of line cards to be processed by the second set of line cards. Connectors that were originally connected to the one or more line cards are removed and coupled to the connectors to the set of temporary line cards, which facilitate data processing while the original line cards are replaced, at which point the process is reversed.

14 Claims, 3 Drawing Sheets

CHANGING LINE CARDS ASSOCIATED WITH A COMMUNICATIONS NETWORK

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of replacing or upgrading line cards associated with a communications network.

BACKGROUND

A common component in a telecommunications networking environment is the central office ("CO"). A central office can be a telephone-company building where subscriber lines are joined to switching equipment for connecting other subscribers to each other, local and long distance. Sometimes, a central office is a wire center in which there might be several switching exchanges. In this case, there will be switches, cable-distribution frames, batteries, air-conditioning and heating systems, etc. But a central office may sometimes be a single telephone switch, what may be referred to in Europe as a public exchange.

A component common in a central office is a line gateway frame. Although perhaps referred to by various names in the telecommunications industry, a line gateway frame houses multiple line cards. A line card is an electronic printed circuit card that operates lamps, ringing, holding, and other such features associated with one or several telephone lines or telephones in a telephone system. It can also refer to a device that transmits and receives optical data and converts optical signals to and from electrical signals. Line cards may transmit multiple data streams to and from other line cards. Typically, line cards plug into switches, cross-connects, multiplexors, and routers that form the building blocks of communications networks.

Over time for various reasons, these line cards may need to be replaced with new line cards. Old line cards may become technologically obsolete, damaged through user error, or corrupted from natural causes such as lightning, and consequently, for whatever reason, need to be replaced.

In some situations, line cards need to be replaced en masse; that is, more than one at a time, even a whole shelf or frame at a time. But replacing line cards is currently a time-and resource-intensive process that can take on the order of 10 to 15 minutes to replace a single card. During this time frame associated with replacing a line card, the customers who are serviced by the line card will be without telephone communications service. Thus, business owners, residents, and possibly even emergency personnel will not have access to their phones and other services while one or more line cards associated with their services are being replaced. The current state of the art could be improved by providing, among other things, a way to reduce customer downtime that stems from having to replace old line cards with new line cards.

SUMMARY

The present invention is described by the claims below. Various embodiments of the invention include an improved method for changing out old line cards with new line cards associated with a telecommunication networking environment. The present invention has several practical applications in the technical arts including substantially reducing the time that customers are without service while one or more line cards need to be changed and decreasing the time associated with changing line cards. The time that customers are without service can be reduced from the order of 10-15 minutes to the order of a few seconds.

In a first aspect of an embodiment of the present invention, a method is provided for replacing a first set of line cards with new line cards. The method includes providing a call-processing unit that includes a primary memory unit and a secondary memory unit, populating a line-card holder, such as a line gateway frame, with a second set of line cards that are interfaced with the call-processing unit; providing for the data that was being processed by the original set of line cards to be processed by the second set of line cards; removing the connectors that were originally connected to the one or more line cards; and coupling the connectors to the set of temporary line cards.

In a second aspect, a method for replacing line cards associated with a communications network is provided. The method includes providing a data file that includes information about customer services associated with a first set of line cards that are ultimately to be replaced by a set of new line cards. The first set of line cards transmit and receive data through respective connectors that are connected to the first set of line cards. The method includes providing a set of temporary line cards that are coupled to a wire-connecting device that is also coupled to the first set of line cards. Both sets of line cards are also coupled to a call-processing unit that has a primary processor and a standby processor. If the primary processor is synchronized with the standby processor, then the method includes desynchronizing the primary processor from the standby processor and associating with the standby processor the information about the customer services. One way of associating the standby processor with the information about the customer services is to upload a data file that includes information about the customer services to the standby processor. The standby processor is caused to enter into an active state while the primary processor is caused to enter into a standby state. The connectors that were originally connected to the original line cards are then coupled to the set of temporary line cards. The original line cards are then replaced with a new set of line cards while the temporary line cards service the customers that were associated with the original line cards. The standby processor is then caused to revert back into a standby state and the primary processor is caused to revert to an active state. Finally, the original connectors that were coupled to the original line cards are then connected to the new line cards.

In a final illustrative aspect, a method is provided for upgrading line cards that are associated with a communications network. The method includes temporarily routing data that was serviced by the line cards to a set of temporary line cards; enabling the temporary line cards to route the data that was being serviced by the original line cards; replacing the line cards with new line cards; and rerouting the data to flow through the new line cards.

BRIEF DESCRIPTION OF THE SEVERAL VIEWS OF THE DRAWINGS

The present invention is described in detail below with reference to the attached drawing figures, which are incorporated by reference herein and wherein.

DETAILED DESCRIPTION OF THE INVENTION

As briefly mentioned in the Background section, a customer's telephone line is supported in a carrier's central office by a port on a line card. The line card is essentially a printed circuit board that may contain one or many ports through which the customers are provided dial tone and various other services. The mapping of the customer's telephone number and subscribed services to the dedicated line-card port occurs in a call-processing unit (CPU).

Figures 1, 1A:
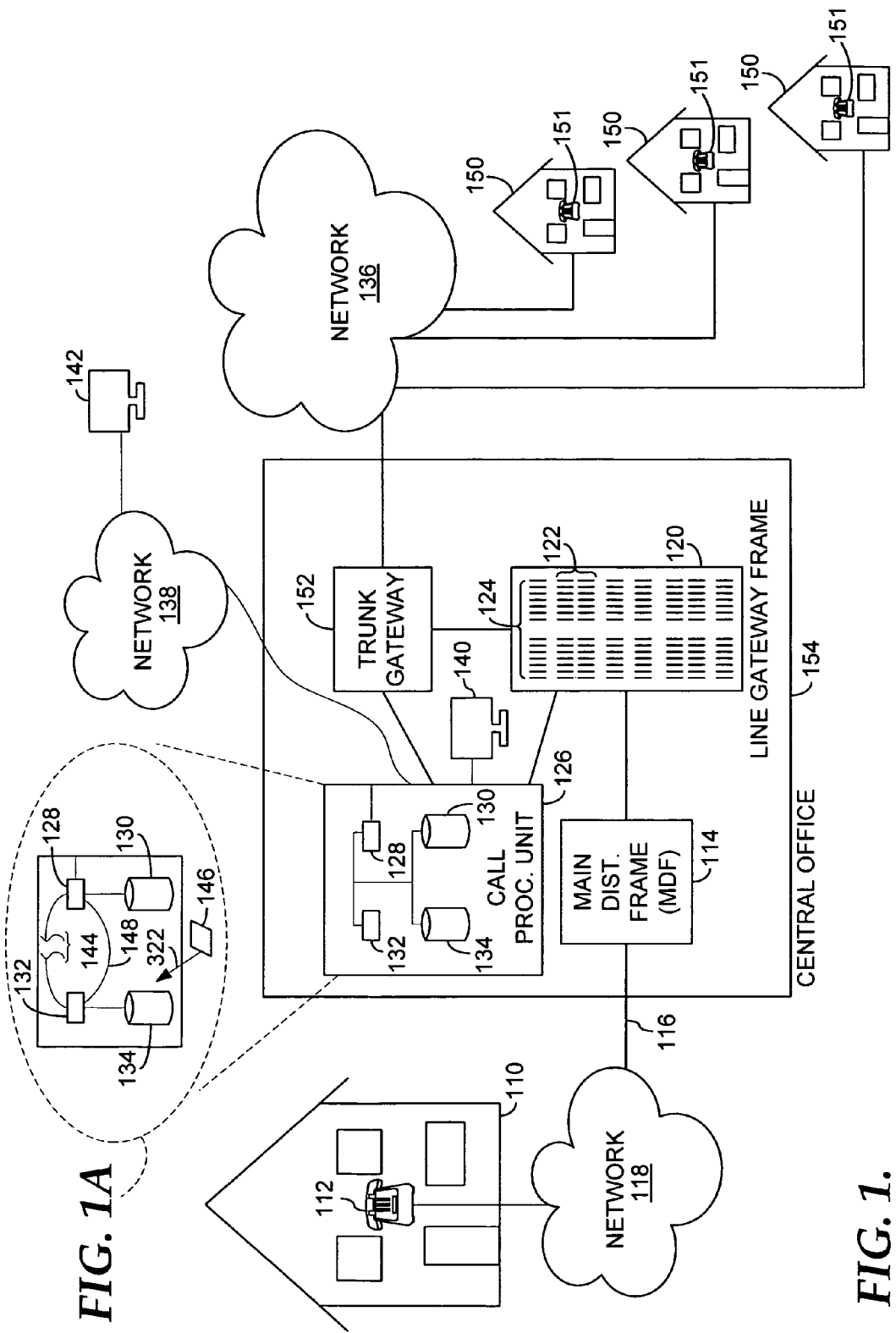
FIG. 1 depicts an exemplary operating environment suitable for practicing an embodiment of the present invention.
FIG. 1A depicts processors or memory components of a call-processing unit operating in a desynchronized state (and later resynchronized)

Turning now to FIG. 1, an illustrative operating environment suitable for practicing an embodiment of the present invention is provided. The operating environment includes an illustrative customer facility 110 having one or more endpoints 112. Endpoint 112 is coupled to a wire-connecting device 114 by line 116 commonly through a network 118. In this embodiment, wire-connecting device 114 takes the form of a distribution frame, or more particularly the main distribution frame. The main distribution frame provides the ability to connect subscribers to the correct ports of a central office. Similarly, cables coming in from many PBX extensions need to connect to the PBX. The cables could be directly wired to the central office or to the PBX, but this would be inflexible. Future moves and changes would be very difficult. Thus, a solution is what is referred to as a distribution frame.

Distribution frame 114 is a wire-connecting device. It does not necessarily require electronics to operate. On one side of the distribution frame may be wires coming in from the outside world, such as line 116. On the other side, wires are terminated coming in from the CO or PBX. Both wires are connected with wire that is commonly referred to as a jumper wire. By pulling off one end of the jumper wire and moving it to another location, customer serving equipment can be quickly changed, cabling can be added or subtracted, and other repairs are made more feasible. In large central offices, distribution frame 114 may span whole city blocks and the jumper wires can be several hundred yards long.

Distribution frame 114 is coupled to a line gateway frame 120. The line gateway frame houses a set of line gateway shelves, such as illustrative gateway shelf 122, which house a number of line cards, collectively referenced by numeral 124. Additional details with respect to line gateway frame 120 will be provided with reference to FIG. 2.

Line gateway frame 120 is coupled to a call-processing unit 126. The call-processing unit may include multiple processors and/or multiple storage components associated with those processors. To not obscure the present invention, a primary processor 128 is shown with an associated primary memory unit 130. Also shown is a standby processor 132 associated with a standby memory unit 134. Call-processing unit 126 facilitates the mapping of customer telephone numbers and their subscribed services to a dedicated line-card port. CPU 126 analyzes digits dialed by the customer and affects routing to other devices such as another line in the central office or to a customer in another central office reachable via communications network 136, which may be the same as networks 138 and 118, but do not have to be. A call-processing unit can be a system and process that sets up the intended connection in a switching system. The unit can scan various trunks and/or station ports for any requests for service. Upon detecting a request, CPU 126 checks stored instructions, such as those that may be stored in storage components 130 or 134, and sets the connection up accordingly.

CPU 126 may be accessed via a local interface component, such as interface component 140, or remotely through a network such as network 138 via remote interface component 142. In a first operating condition, processors 128 and 132 are synchronized as are memory components 130 and 134 to process calls. But the depiction provided in FIG. 1 should not be construed as limiting in nature, but is intentionally shown simplistically to not obscure the present invention. In other embodiments, two active processors may be present along with one standby processor. The processors are always active, but memory functionality may be offered by what is referred to as shared memory. Thus, when processor 128 is desynchronized from 132, or when memory component 130 is desynchronized from standby memory component 134, each operates independently. FIG. 1A illustrates a desynchronization and resynchronization of the processors, which can be extrapolated to include the memory components.

Desynchronization between processors is depicted by numeral 144, which indicates that primary processor 128 can be desynchronized from standby processor 132. Similarly, primary memory unit 130 may become desynchronized from standby memory unit 134, which can then receive a data file 146, which may store information associated with various communications services for one or more customers. That the processors and memory may be resynchronized is depicted by reference numeral 148. Network 136 may be coupled to many hundreds or thousands of customers illustratively represented by numeral 150.

CPU 126 and line gateway frame 120 are shown coupled to a trunk gateway 152, which is a component that provides access to network 136, which may be the public switched telephone network (PSTN), and provides service to customers 150. Main distribution frame 114, CPU 126, trunk gateway 152, and line gateway frame 120 are illustratively shown housed in a central office 154.

Figure 2:
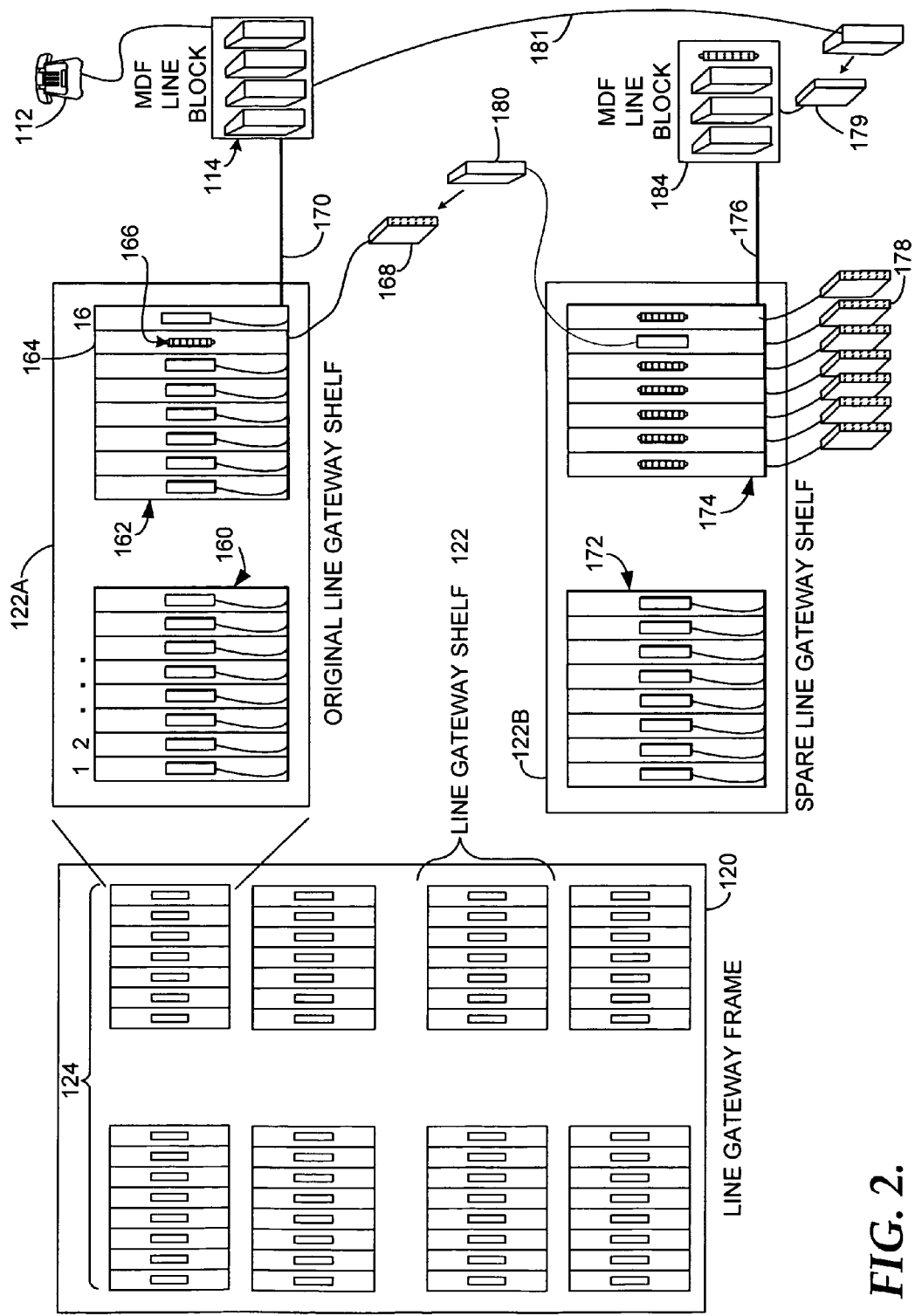
FIG. 2 depicts in greater detail an illustrative line gateway frame and spare line gateway shelf suitable for use in an embodiment of the present invention.

Turning now to FIG. 2, additional detail of line gateway frame 120 and a line gateway shelf such as line gateway shelf 122 is provided. As shown, line gateway frame 120 can include a set of line-card holders, such as line gateway shelf 122. Line gateway frame 120 is illustratively depicted as either having multiple line gateway shelves, depending upon nomenclature that is common to those of ordinary skill in the art. For clarification purposes, a first line gateway shelf is referenced by numeral 122A, and a spare line gateway shelf is referenced by numeral 122B. But both shelves 122A and 122B are of the type referenced generally by numeral 122 referring to a generic line gateway shelf. Turning to line gateway shelf 122A, the shelf typically has mounting slots for multiple line gateway cards. In this generic depiction sixteen line gateway cards are provided. In actuality from 1 to many line gateway cards may be equipped in a line gateway shelf. A specific line card is referenced by numeral 164. Line card 164 is not unique among the set of line cards 124 but, again, is labeled purely for referential purposes. Line card 164 includes an input/output port 166. In actuality, line card 164 may have many ports such as 1, 2, 4, 8, 16, 32, etc., ports. A cable 170 couples the line card in shelf 122A to a line block on distribution frame 114.

Spare line gateway shelf 122B may be independent of line gateway frame 120 or an available shelf within line gateway frame 120. It too includes one or more line cards and corresponding cables such as cable 176 in this depiction for coupling it to distribution frame 184. Spare line gateway shelf 122B is depicted generally as being associated with a removed connector 178.

In operation, the cards of spare line gateway shelf 122B are used to temporarily service customers 112 while the line cards of in-service shelf 122A are being replaced. Thus, rather than the downtime being equal in duration to the amount of time associated with physically replacing and reconfiguring the line cards of shelf 122A, the only downtime is that associated with coupling the connectors of shelf 122A to the cards of shelf 122B, which is significantly shorter.

Figure 3:
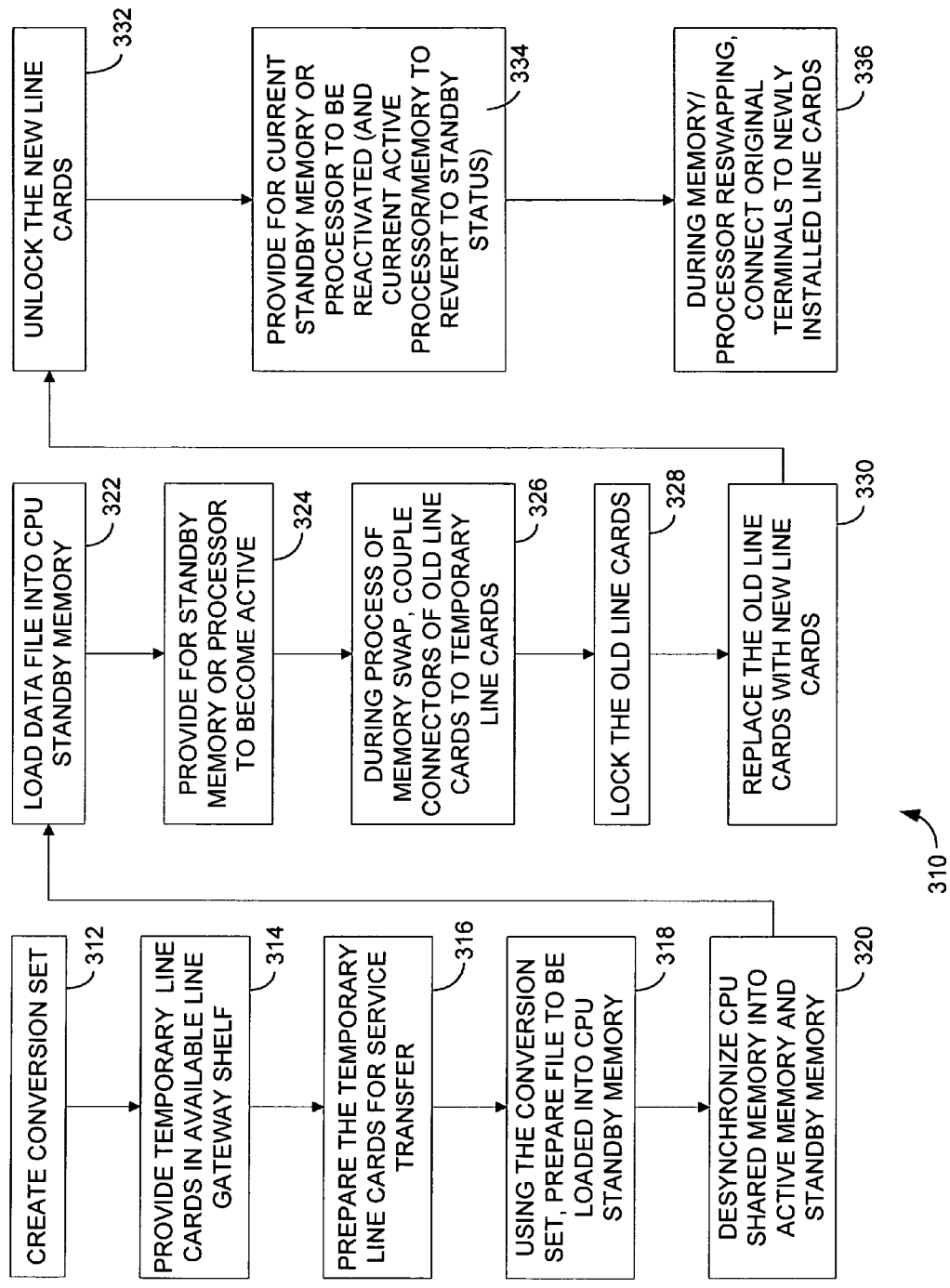
FIG. 3 is a flow chart depicting an illustrative method for practicing an embodiment of the present invention.

Turning now to FIG. 3, an illustrative method for changing line cards according to an embodiment of the present invention is provided and referenced generally by the numeral 310. At a step 312, a conversion set is created. Conversion set 312 includes information about customers, their respective services, and the corresponding line cards associated with providing those services to the customer. Returning briefly to FIG. 1, data file 146 is an illustrative conversion set. Thus, creating conversion set 146 includes in one embodiment creating a data file that lists line cards to be replaced, customers associated with the line cards that will be affected by their replacement, and possibly other data such as the services associated with those customers.

Process 310 begins with both processors of CPU 126 and the memory unit synchronized. When the processors 132 and 128 are synchronized with each other, then both operate to service and process data associated with the various customers such as customers 112. At a step 314, a set of temporary line cards is provided in an available line gateway shelf. For purposes of this example, assume cards 162 of original shelf 122A are to be replaced with a new set of cards not shown. Cards 174 of spare line gateway shelf 122B will be used to service and process the data that was being serviced by card set 162.

At a step 316, temporary line cards 174 are prepared for service transfer, which entails temporarily servicing the customers via cards 174 that were serviced by cards 162. Preparing cards 174 includes configuring the cards to mirror the functionality offered by cards 162, which are to be replaced. This can be done via a graphical user interface such as interface 140 or 142. A line administration graphical user interface provides a means for an administrator to initiate commands to prepare the temporary cards 174 to service customers 112, which in this example are illustratively assumed to be serviced by cards 162.

At a step 318 an actual data file, such as file 146, is prepared using the conversion set created in step 312. The file is prepared to be loaded into CPU standby memory component 134. At a step 320, the shared memory of CPU 126 is desynchronized into an active memory component and a standby memory component. For example, memory component 130 may be the active memory component, which continues to service customers 112, while memory component 134 is relegated to a standby status, wherein it may not continue to service customers 112. This desynchronization step may be accomplished in a variety of ways. For instance, those skilled in the art may also appreciate that the processors of CPU 126 may be desynchronized. In this embodiment, processor 128 is desynchronized from processor 132, such that processor 128 may be in an active state while processor 132 may be in a standby state. In either case, the thrust of what is being accomplished is to free a resource that will be able to receive new call-instruction data in real time while customers currently serviced by CPU 126 continue to receive their service.

With the shared memory of CPU 126 desynchronized from each other, data file 146 is loaded into standby memory component 134 at a step 322. This step is also referenced in FIG. 1A by numeral 322. Now standby processor 132 is associated with a memory component 134 that houses the information necessary for temporary line cards 174 to service customers 112. This being the case, the standby memory is ready to become active and take over processing from primary processor 128, which is associated with primary memory component 130.

Accordingly, at a step 324, standby memory component 134 and standby processor 132 are transitioned from a standby state to an active state. It is common for a small duration of time to be associated with effecting this change. That is, there is a gap between when the command is issued to place the standby processor 132 and memory component 134 into an active state and vice versa for processor 128 and memory component 130 and actually have that change occur. For the sake of efficiency, this is an opportune time to make the necessary physical wiring adjustments between the original cards 162 and temporary cards 174.

At a step 326, preferably during step 324 while the primary processors and standby processors swap state, the connectors that were connected to old cards 162 are removed and coupled to temporary cards 174. This can happen in a variety of ways. In a first embodiment, a connector such as connector 168 may be directly connected to a port on one of the line cards from the set 174. In an alternative embodiment, a jumper cable 180 is employed to couple connector 168 to a corresponding port on a line card in set 174. In a still another embodiment, jumper cable 181 is employed to couple connector 179 on the line cable from a corresponding port on a line card in set 174 to line block 114 where the terminations are made to connect to customers 112. After about the time associated with making the physical line-card changes, temporary line cards 174 will begin servicing customers 112. The time associated with this is on the order of 1 to 2 minutes or as small as a few seconds. Thus, customers 112 "experience" a service outage on the order of seconds.

Line cards 162 are no longer servicing customers 112. Thus, the technician can replace old line cards 162 with the new line cards (not shown) in bulk. That is, a technician may replace all of the line cards in set 162 at the same time rather than having to serially replace each individual line card. In the prior art, replacing line cards in bulk like this would not have been feasible because customers would experience an outage for as long as it would take to replace the entire shelf. But given the advantage of the present invention, a technician may replace an entire shelf or more at a time. Thus, at a step 328, the old cards 162 are locked down. At a step 330, old line cards 162 are replaced with new line cards. The new line cards can then all be unlocked at a step 332, which is known and understood by one of ordinary skill in the art.

At a step 334, provisions are made for what is now the current standby memory or processor to be reactivated (and the current active processor/memory to be reverted to standby status). Thus, processor 128 is reverted back to an active status as is memory component 130. At the same time, processor 132 is reverted to a standby status as is memory component 134. As with the last instance, while the active and standby processors are being swapped, the original connectors associated with the old line cards 162 (such as connector 168) are attached to the newly installed line cards. After a short while, the preprogrammed new line cards will come online and begin servicing customers 112. Again, the customers 112 only experience a brief outage for a few moments while standby processors and active processors are again swapped. So while the CPU change is in progress, the line cards associated with 122A are brought online having been re-connected to connector(s) 168. Finally the processors are re-synchronized removing the temporary data 146 and returning to normal operation on the newly replaced cards. A software command to read in a journal file for any changes during activities can be completed and dial tones checked. Those skilled in the art may appreciate alternative ways of implementing various embodiments of the present invention without departing from the scope of the claims below, which define the invention.

The invention claimed is:

1. A method for replacing a first set of one or more line cards that process data in a communications network environment, said one or more line cards respectively associated with one or more connectors, the method comprising:
    providing a call-processing unit (CPU) having a primary memory unit and a second memory unit;
    populating a line-card holder with a second set of one or more line cards, wherein said line-card holder is interfaced with said CPU;
    providing for the data processed by said first set of line cards to be processed by said second set of line cards;
    removing the one or more connectors from said first set of one or more line cards; and
    coupling the one or more connectors to said second set of one or more line cards.

2. The method of claim 1, wherein providing a call-processing unit (CPU) having a primary memory unit and a standby memory unit comprises providing a primary memory unit that can be synchronized with said standby memory unit and, if desired, operate independently from said standby memory unit.

3. The method of claim 1, wherein said line-card holder is a line shelf, including a line gateway shelf.

4. The method of claim 3, further comprising replacing said first set of one or more line cards with a permanent set of one or more line cards.

5. The method of claim 4, further comprising, resynchronizing said primary memory unit with said standby memory unit.

6. The method of claim 5, further comprising coupling said one or more connectors to said permanent set of one or more line cards.

7. The method of claim 1, wherein providing for the data processed by said first set of line cards to be processed by said second set of line cards comprises:
    creating an information set that includes information about customers being serviced by the first set of one or more line cards;
    causing said primary memory unit to operate independently from said secondary memory unit; and
    populating said standby memory unit with said information set.

8. The method of claim 7, wherein causing said primary memory unit to operate independently from said secondary memory unit includes desynchronizing said primary memory unit from said standby memory unit.

9. The method of claim 1, wherein coupling the one or more connectors includes employing an intermediary cable to couple said one or more connectors to said second set of one or more line cards.

10. A method for replacing line cards associated with a communications network, the line cards being coupled to a wire-connecting device and to a call-processing unit comprising a primary processor and standby processor, the method comprising:
    providing a data file that includes information about customer services associated with a first set of line cards that are ultimately to be replaced by a set of new line cards, wherein said first set of line cards transmit and receive communications data via respective connectors connected to said first set of line cards;
    providing a set of temporary line cards, said temporary line cards coupled to said wire-connecting device;
    if said primary processor is synchronized with said standby processor, desynchronizing said primary processor from said standby processor;
    associating with said standby processor the information about the customer services;
    causing said standby processor to enter an active state, and said primary processor to enter a standby state;
    coupling said respective connectors to said temporary line cards;
    replacing said first set of line cards with said set of new line cards;
    causing said standby processor to revert to a standby state, and said primary processor to revert to an active state; and
    coupling said respective connectors to new line cards.

11. The method of claim 10, wherein said wire-connecting device is a distribution frame.

12. The method of claim 11, wherein associating with said standby processor the information about the customer services comprises loading into a memory component associated with said standby processor said data file.

13. The method of claim 12, wherein coupling said respective connectors to said temporary line cards includes:
    connecting said connectors directly to said temporary line cards; or
    employing an intermediary cable to couple said connectors to said temporary line cards.

14. The method of claim 13, wherein causing said standby processor to revert to a standby state, and said primary processor to revert to an active state comprises resynchronizing said standby processor with said primary processor.

* * * * *